(12) United States Patent
Barker et al.

(10) Patent No.: US 7,618,676 B2
(45) Date of Patent: Nov. 17, 2009

(54) FIBRE COATING METHOD AND APPARATUS

(75) Inventors: Philip A Barker, Ipswich (GB);
Christopher Fisk, Ipswich (GB);
Raymond P Smith, Woodbridge (GB)

(73) Assignee: British Telecommunications public limited company, London (GB)

( * ) Notice: Subject to any disclaimer, the term of this patent is extended or adjusted under 35 U.S.C. 154(b) by 186 days.

(21) Appl. No.: 10/513,883

(22) PCT Filed: May 9, 2003

(86) PCT No.: PCT/GB03/02011

§ 371 (c)(1),
(2), (4) Date: Nov. 9, 2004

(87) PCT Pub. No.: WO03/095386

PCT Pub. Date: Nov. 20, 2003

(65) Prior Publication Data
US 2005/0153067 A1    Jul. 14, 2005

(30) Foreign Application Priority Data
May 10, 2002    (GB)    ................... 0210760.5

(51) Int. Cl.
*B05D 1/20* (2006.01)
*B05B 5/14* (2006.01)

(52) U.S. Cl. .................. 427/185; 427/195; 118/309

(58) Field of Classification Search .............. None
See application file for complete search history.

(56) References Cited

U.S. PATENT DOCUMENTS

| | | | | |
|---|---|---|---|---|
| 3,453,134 A | * | 7/1969 | Haw | .......................... 427/473 |
| 3,919,437 A | | 11/1975 | Brown et al. | |
| 4,839,199 A | | 6/1989 | de Jager | |
| 5,123,949 A | | 6/1992 | Thiessen | |
| 5,128,199 A | | 7/1992 | Iyer et al. | |
| 5,310,582 A | * | 5/1994 | Vyakarnam et al. | .......... 427/560 |
| 5,773,097 A | * | 6/1998 | Rogari | .......................... 427/459 |
| 5,851,450 A | * | 12/1998 | Rennie et al. | ............... 264/1.28 |
| 5,895,622 A | | 4/1999 | Ramani et al. | |
| 5,911,942 A | | 6/1999 | Fofonoff et al. | |

(Continued)

FOREIGN PATENT DOCUMENTS

EP    0108590 A1    5/1984

(Continued)

OTHER PUBLICATIONS

International Search Report, 2003.

(Continued)

*Primary Examiner*—Frederick J Parker
(74) *Attorney, Agent, or Firm*—Nixon & Vanderhye PC (57) ABSTRACT

A fiber unit coating apparatus includes a chamber into which an uncured resin coated fiber unit is passed. Microspheres mixed with air are fed into the chamber via ducts and apertures. As a result rapid and even application of the microspheres can be achieved, and the system allows controllable application of the microspheres by varying the rate of flow of the air/microsphere mixture. Positive pressure chambers are provided to prevent the microspheres from blocking the inlet and outlet points where the fiber unit enters and leaves the chamber.

26 Claims, 5 Drawing Sheets

U.S. PATENT DOCUMENTS 6,420,873 B1 * 7/2002 Guthrie .................... 324/322

FOREIGN PATENT DOCUMENTS

| EP | 0345968 | A2 | | 12/1989 |
| EP | 0521710 | A1 | | 1/1993 |
| EP | 0757022 | A1 | | 2/1997 |
| GB | 2073620 | A | | 10/1981 |
| GB | 2 299 283 | | * | 10/1996 |
| WO | WO 00/26711 | | | 5/2000 |
| WO | WO 01/05583 | A1 | | 1/2001 |

OTHER PUBLICATIONS

European Search Report, 2003.

* cited by examiner

FIBRE COATING METHOD AND APPARATUS

This application is the US national phase of international application PCT/GB03/02011 filed 9 May 2003 which designated the U.S. and claims benefit of GB 0210760.5, dated 10 May 2002, the entire content of which is hereby incorporated by reference.

BACKGROUND

1. Technical Field

The invention relates to a fibre coating method and apparatus in particular for coating optical fibres.

2. Related Art

It is known to protect optical fibres by laying them in ducts. One well-known approach to laying the fibres in ducts comprises fibre blowing (or "blown fibre"). European patent application no. 0108590, commonly assigned herewith describes a fibre blowing technique in which the fibre is blown into a duct on a cushion of air, relying on viscous drag to advance the fibre.

In order to further protect the fibres conventional resin coatings such as silicone coatings or UV cured acrylate polymer are known, providing protection from damage and micro cracks. It has been found that embedding glass microspheres or other particulate matter into a resin coating on the fibres such as an acrylate polymer provides particularly good results for blown fibre. The coating is applied to an optical fibre unit comprising either a single fibre or a bundle of fibre.

European patent application no. 0521710, commonly assigned herewith, describes an improved method of coating an optical fibre unit so as to obtain better viscous drag and lower friction in a blown fibre process, where particulate matter such as microspheres typically between 10 and 200 μm diameter are embedded in the resin coating. In the process, fibre is fed from a drum through a first resin curing system, a further resin coating is applied, the fibre unit passes through a fluidised/aerated mass of microspheres (preferably electrostatically charged for uniform coating) in a through passage. The microspheres adhere to the resin coating and the coating is UV cured.

A problem with this known arrangement is that the fibre inlet and outlet can become blocked with particles requiring downtime to clear the blockage. This can be a particular problem when the microspheres are electrostatically charged as they are attracted to other surfaces than the fibre unit surface.

U.S. Pat. No. 5,851,450 describes an arrangement in which turbulence is introduced in the through passage to obtain an even distribution of microspheres in the resin coating. The microspheres enter through a horizontal duct, are deflected downwardly to introduce turbulence and further turbulence is induced by angled ribs in the through passage. In addition the fibre inlet and outlet are shaped so as to deflect the particles from the inlet and outlet. A problem with this arrangement is that it is difficult to adjust the operating properties of it without effectively rebuilding the apparatus as its operation is highly dependent on the configuration of the through passage.

A further problem with known arrangements is that the throughput speed for coating the fibre is limited, with the apparatus unable to reach speeds of the order of 300 m/min without severely affecting the uniformity of distribution of the embedded microspheres.

Further problems with known arrangements are that in some cases it may be difficult to ensure that there is no leakage of microspheres from known apparatus.

BRIEF DESCRIPTION OF THE DRAWINGS

Embodiments of the invention will now be described by way of example with reference to the figures of which.

DETAILED DESCRIPTION OF EXEMPLARY EMBODIMENTS

Figure 1:
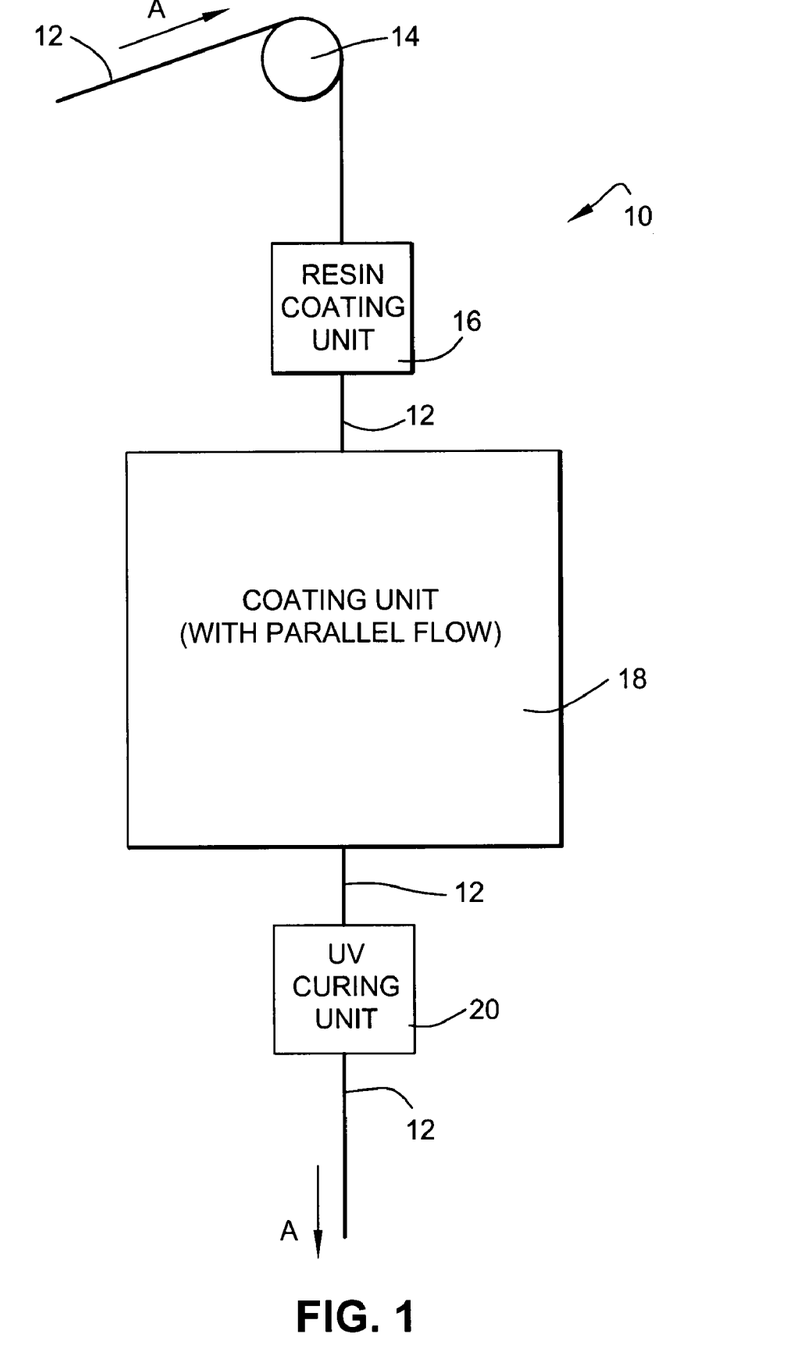
FIG. 1 is a block diagram of components of a fibre coating system.

The materials, apparatus components and processes for advancing and coating optical fibres will be well-known to the skilled person and are described in overview only here, with reference to FIG. 1. The apparatus which is designated generally 10 includes an optical fibre unit 12 comprising either single fibre or a bundle of fibres drawn from a drum (off-line operation) or formed directly (on-line operation) upstream (not shown). The fibre is drawn in the direction designated by arrow A. One or more directional rollers 14 are provided such that the direction of the drawing of the fibre unit 12 can be easily controlled. The fibre passes through a resin coating element 16 and from there into a micro sphere coating unit 18 in which the fibre unit is coated with microspheres. An electrostatic gun (not shown) may be associated with the coating unit 18 to charge the microspheres and hence improve their attraction to the fibre unit 12. In addition positive pressure chambers are preferably placed at the fibre inlet and outlet of the coating unit 18 to prevent leakage of the microspheres. A range of alternative micro sphere coating units 18 are described below in more detail and form the basis of the present invention. The coated fibre unit 12 then passes into a UV curing unit 20 and from there to any appropriate downstream treatment units.

Although the fibre unit 12 is shown being coated in a vertical orientation, dependent on the coating regime imposed at the coating unit 18, it can equally run horizontally during the coating process with the provision of appropriate directional rollers 14.

The optical fibre itself can be of any appropriate type as can the coating, and in particular an example of an appropriate coating is UV curable acrylate polymer. Any appropriate particulate matter can be embedded in the coating in the coating unit 18 although preferably microspheres of solid glass and diameter typically between 10 and 200 μm are applied. The feed rate of the fibre unit 12 through the apparatus can exceed 300 m/min. Throughout the present description like reference numerals refer to like parts.

Figure 2:
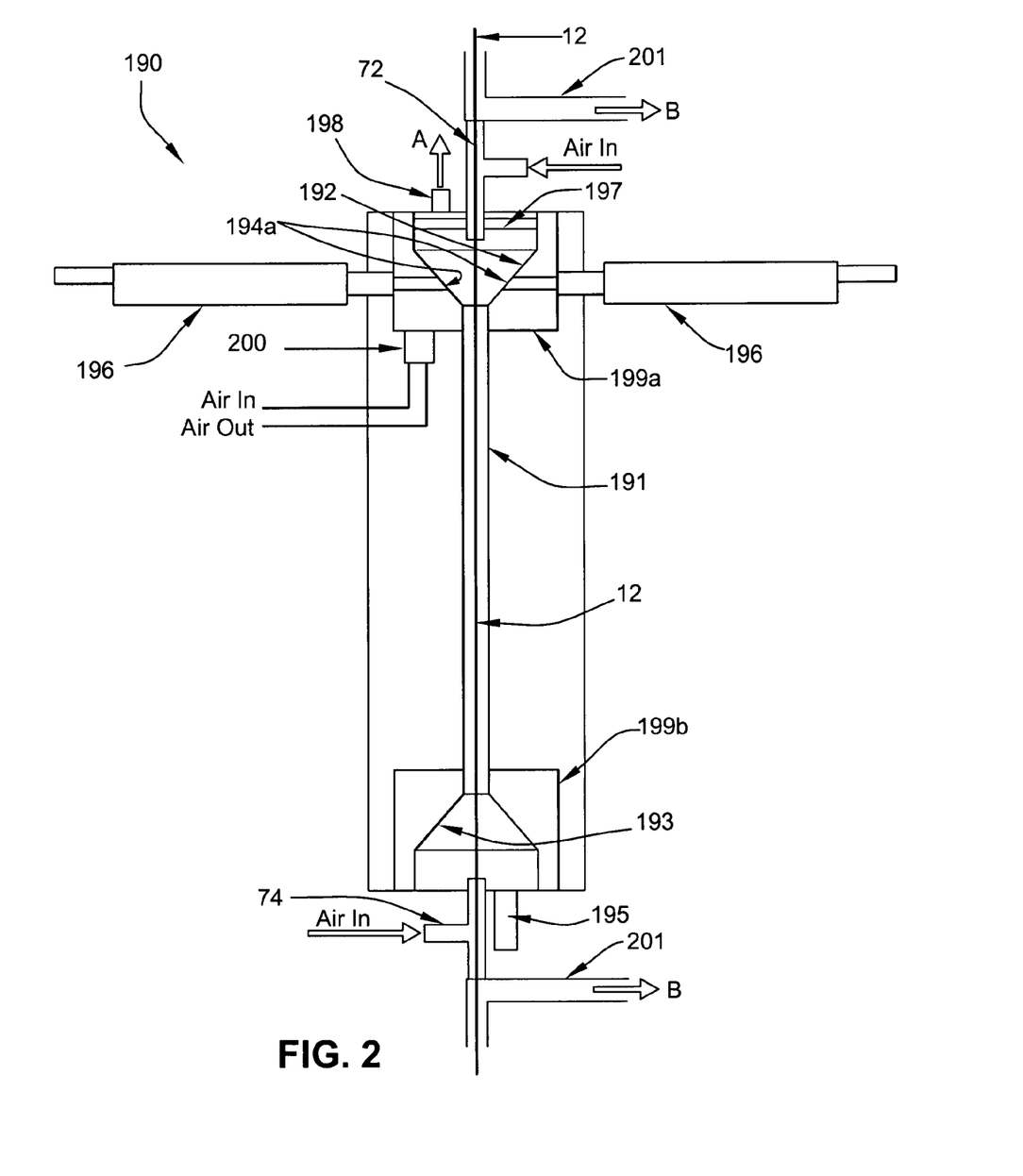
FIG. 2 is a block diagram of a fibre coating unit according to a first embodiment.

A first embodiment of the fibre coating unit 18 is shown in FIG. 2. The uncured resin coated fibre unit 12 passes through a coating chamber 190, which comprises a generally cylindrical glass tube 191 terminating at each end in a substantially solid block (199a and 199b) which each define a chamber having a frusto-conical surface (192 and 193). The fibre unit 12 also passes through positive pressure chamber 72 located adjacent the first end 192 and positive pressure chamber 74 located adjacent the second end 193.

A mixture of air and microspheres is admitted into the coating chamber via two ducts 196 passing through block 199a and apertures 194a located in the frusto-conical surface 192. Although in the embodiment there are only two ducts and apertures, it is understood that the air and microsphere mixture may be admitted using a plurality of ducts/apertures entering either through the walls of the block 199a or alternatively directly into the tube 191 (as shown later in FIG. 3). The air and microsphere mixture is created either by fluidising the microspheres in a hopper (not shown) or mechanical metering method. The microspheres are then entrained with the flow of air which is pushed along ducts 196 and into the glass tube 191.

The air and microsphere mixture distributes through the tube 191, causing microspheres to contact and adhere to the uncured resin coated surface of the fibre unit 12. The flow of air and entrained microspheres passes along the tube 191 and exits through scavenging outlet 195 which collects the unused microspheres which have not adhered to the fibre unit 12. The collected air and microsphere mixture is recycled for later use by re-entry via ducts 196 and apertures 194a.

A filter membrane 197 extends across the entire cross-sectional area of the first end 192, except for an area through which positive pressure chamber 72 containing the fibre unit 12 protrudes. Membrane 197 serves to prevent any microspheres from exiting the chamber through an air exit duct 198 which acts as a pressure relief by allowing air to leave the chamber as necessary as indicated by arrow A. In addition, air may be introduced through duct 198 and membrane 197 to aid the flow of microspheres through the chamber.

A vibration mechanism 200 is attached to the block 199a which encloses the top of the tube 191. Vibration mechanism 200 is used to cause small vibrations or agitations to permeate through the block and therefore supply localised vibrations to the section of the chamber enclosed by the block, which includes the top of the tube, together with the entry apertures 194a and membrane 197. The vibrations can help prevent the undesirable settling of some microspheres on surfaces, such as for example the frusto-conical surface 192, and enhances the flow of microspheres through tube 191 by preventing build up within the chamber defined by block 199a. The vibration mechanism 200 illustrated in FIG. 2 is air-driven although it is understood that any suitable vibrating or agitating means may be used.

The rate of flow of the air and microsphere mixture through ducts 196 is controllable, and thereby allows for feedback to change the density of the coating of microspheres on the fibre unit 12. A downstream sensor (not shown) can detect the coating density and a control unit can vary the air and microsphere flow accordingly until the desired coating is achieved.

Figure 3:
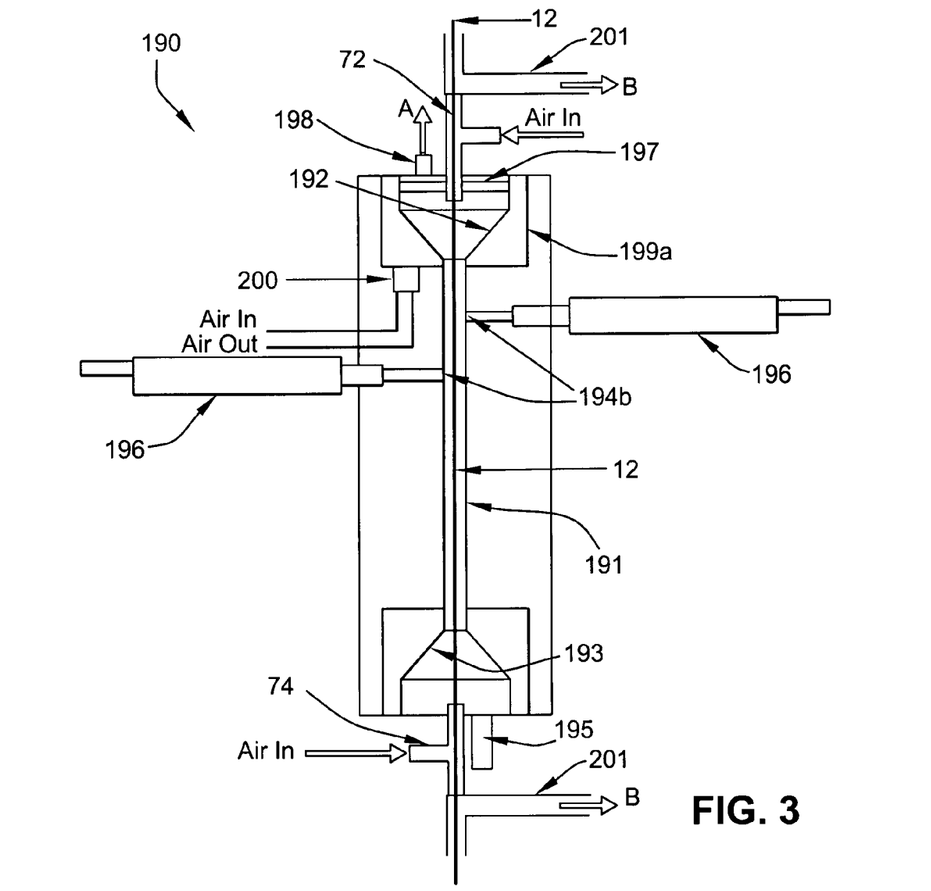
FIG. 3 is a block diagram of a fibre coating unit according to a variation of the first embodiment.

A variation on the first embodiment is illustrated in FIG. 3, in which like numerals designate like features. In this variation, the air and microsphere mixture is admitted at staggered locations along the cylindrical portion of the glass tube, as indicated by ducts 196 and apertures 194b.

Figure 4:
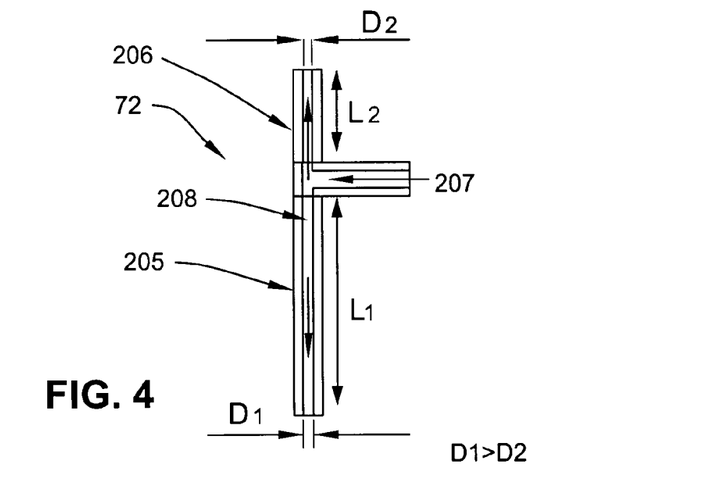
FIG. 4 is a block diagram of a positive pressure chamber for use in fibre coating apparatus.

Referring to FIG. 4, positive pressure chamber 72 is now described in more detail. The chamber comprises two elongate tubular portions 205 and 206, joined by inlet 207 through which pressurized air is introduced. Together these define a channel 208 of varying radius, through which the fibre unit 12 may pass unhindered. Air flow entering the channel from the inlet 207 flows in both directions away from the inlet, with the larger proportion of the air flow occurring towards tube 191. The proportion of airflow in the different directions is influenced by the inner diameter differential D1>D2 between the two elongate tubular portions 205 and 206 as illustrated in the drawing (where D1 is the inner diameter of the tubular portion 205 closest to tube 191). Alternatively, or in addition, the length differential L2>L1 can be used to influence the proportions of airflow.

The operation of the positive pressure chamber 72 as described above generates a stream of gas into the tube 191 thereby substantially preventing microspheres from entering the pressure chamber 72 and escaping, and operates at a higher pressure than air which conveys microspheres within the fibre coating unit. It will be understood that a corresponding pressure chamber 74 at the opposite end of the coating chamber will operate in a similar manner.

Figure 5:
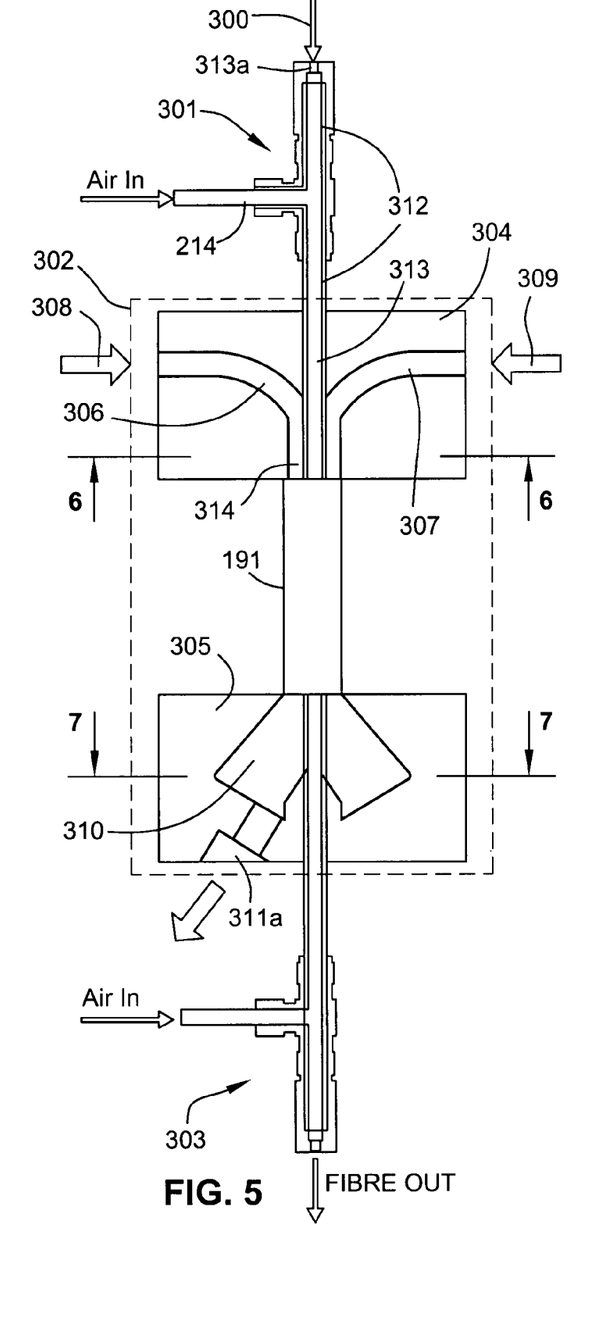
FIG. 5 is a schematic view of a fibre coating unit according to a second embodiment.
Figure 6:
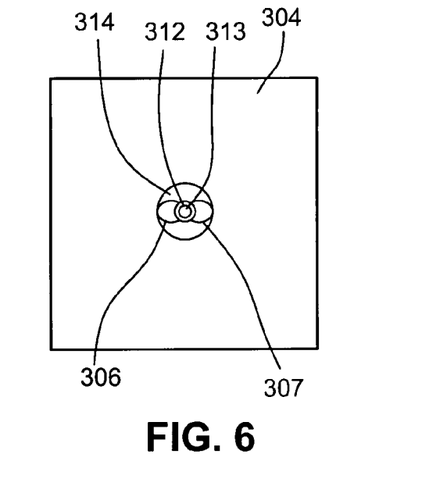
FIG. 6 is a cut-away view along the line A-A of FIG. 5.
Figure 7:
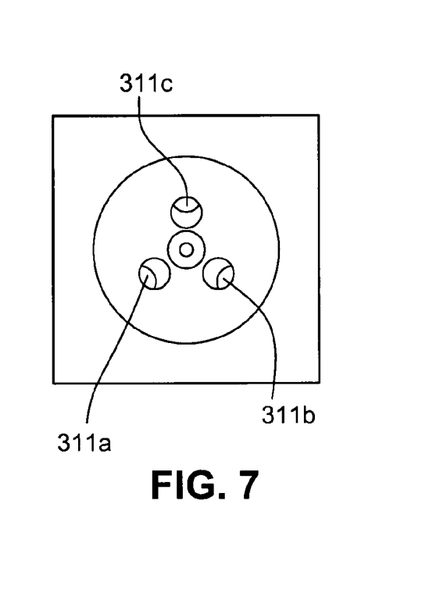
FIG. 7 is a cut-away view alone the line B-B of FIG. 5.

A second embodiment of the fibre coating unit 18 is shown in FIGS. 5-7, and comprises positive pressure chamber 301, coating chamber 302 and positive pressure chamber 303. The uncured resin coated fibre unit 12 passes through these in the direction indicated by arrow 300. An air and microsphere mixture within coating chamber 302 causes multiple microspheres to adhere to the uncured resin coating of the fibre unit, which is then cured downstream as discussed earlier.

Coating chamber 302 comprises two substantially solid blocks 304 and 305, separated by a cylindrical glass tube 191 which together define a passage through which the fibre unit 12 passes. A mixture of air and microspheres is admitted into the coating chamber 302 (in the directions indicated by arrows 308 and 309) via two inlet ducts 306 and 307 formed within upper block 304. The two ducts 306 and 307 open into an annular cavity 314 within block 304. The cavity 314 is formed concentrically around the passage through which the fibre unit will pass, and opens directly into the end of glass tube 191. A cut-away view looking upwards through coating chamber 302 along line A-A is shown in FIG. 6, illustrating the annular cavity 314 with ducts 306 and 307 joining at the top. The air and microsphere mixture passes through this annular cavity and then enters into glass tube 191.

The air and microsphere mixture may be created either by fluidising the microspheres in a hopper (not shown) or a mechanical metering method. The microspheres are entrained with the flow of air through ducts 306 and 307, cavity 314, and through glass tube 191 where the coating of the fibre occurs. The air and microsphere mixture finally passes through a frusto-conical shaped cavity 310 within lower block 305 formed concentrically around the passage through which the fibre unit will pass. The unused air/microsphere mixture exits the coating chamber 302 via three outlets 311a, 311b and 311c, and can be recycled for later use by re-entry via inlet ducts 306 and 307 if desired. A cut-away view through block 305 along the line B-B is shown in FIG. 7.

The distribution of glass microspheres adhering to the fibre unit 12 can be readily and quickly adjusted by changing the feed rate of the air/microsphere mixture through inlet ducts 306 and 307. A downstream sensor (not shown) can detect the coating density or distribution of the microspheres on the fibre unit 12 after it has exited the fibre coating unit, and a control unit may be provided to vary the air/microsphere feed rate so as to vary the density or distribution accordingly.

Positive pressure chambers 301 and 303 are provided at either end of the coating chamber 302, so as to prevent leakage of the microspheres from the chamber, and to protect the system from blockage by microspheres where the fibre unit enters and leaves the chamber. Pressure chamber 301 comprises an elongate cylindrical channel 313 formed by tubing 312, through which the fibre unit 12 will pass. Part way along this channel is an inlet provided by tubing 214, via which pressurised gas is introduced into channel 313. Part of tubing 312 extends through block 304.

Channel 313 is designed to have differing minimum internal diameters either side of the inlet, with the portion of channel 313 on the side of the inlet furthest from the chamber having the smaller minimum internal radius, namely at location 313a. Pressurised gas entering the channel via inlet tubing 214 will thus flow preferentially in the direction towards the coating chamber 302.

Positive pressure chamber 301 is designed such that channel 313 terminates substantially concurrently with the end of annular cavity 314 through which the air/microsphere mixture flows, thus ensuring that the fibre unit is protected from the microspheres becoming too deeply embedded in the resin coating.

The design of positive pressure chamber 301, ducts 306 and 307 and cavity 314 together ensure that the flow of air/microsphere mixture through ducts 306 and 307 has ceased to be directed substantially radially inwards (which could create too great a force of impinging microsphere particles on the fibre unit resulting in the microspheres becoming embedded too deeply and/or damaging the fibre unit) but has instead been redirected to flow generally longitudinally along the chamber 302, within tube 191. Thus, the flow of gas/microsphere mixture as it enters the tube 191 (ie the vector sum of the individual flow vectors of the molecules within the gas/microsphere mixture at that point) is directed generally parallel with respect to the longitudinal axis of the closest portion of fibre unit 12. There is of course a distribution of various speeds and directions of the molecules within the mixture which enables microspheres to impinge upon and adhere to the resin coating, but the fact that overall the flow is generally parallel to the fibre means that it prevents a significant number of the microspheres from impinging directly onto the fibre at too great a speed. This enables the system to be run at very high speeds, increasing the flow of air/microsphere mixture accordingly without damage to the fibre unit and/or poor coating quality, and achieving speeds typically between 300-500 m/min.

It is understood that corresponding positive pressure chamber 303 at the other end of the coating chamber 302 is similar in design and operation to chamber 301.

The design of the fibre coating unit of the second embodiment also facilitates, in operation, easy threading through of fibre unit 12. Threading is achieved by inserting a pole from each end through positive pressure chambers 301 and 303, the poles having mating connections which meet centrally within the glass tube 191. The transparent nature of the glass tube allows the user to easily view the mating connecting ends of the two poles, which once connected together can be pulled though until one of the poles (a tube through which the fibre may be threaded) extends throughout the chamber 302. The fibre unit may then be fed through the tube, which is then removed.

Figure 8:
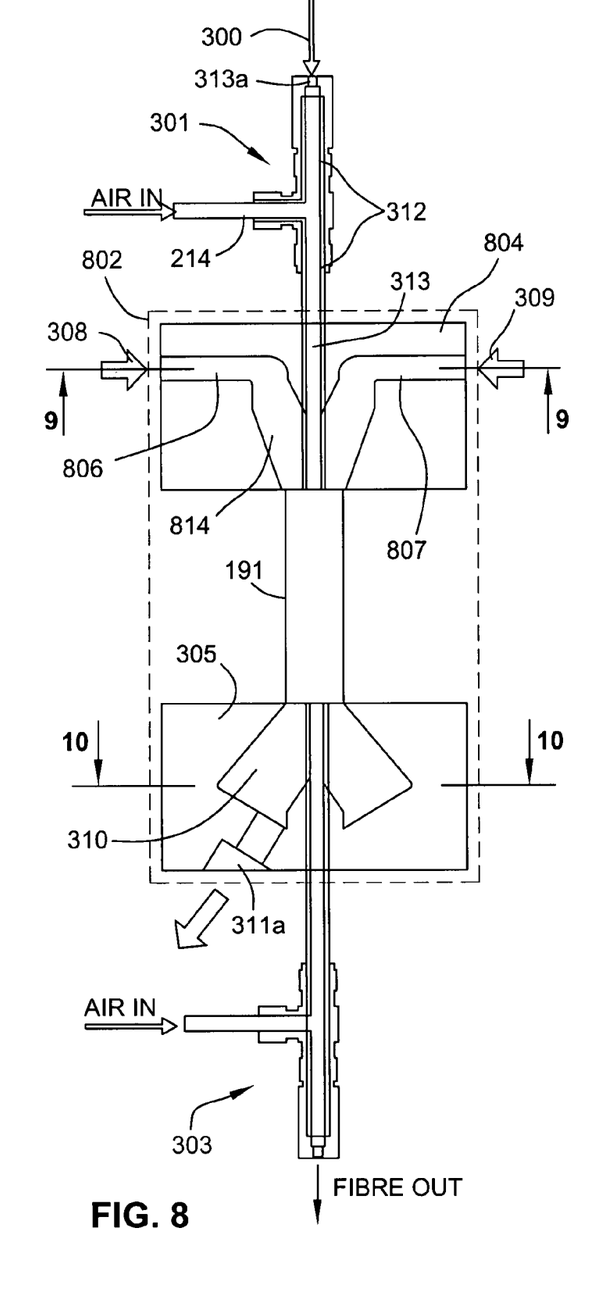
FIG. 8 is a schematic view of a fibre coating unit according to a third embodiment.
Figure 9:
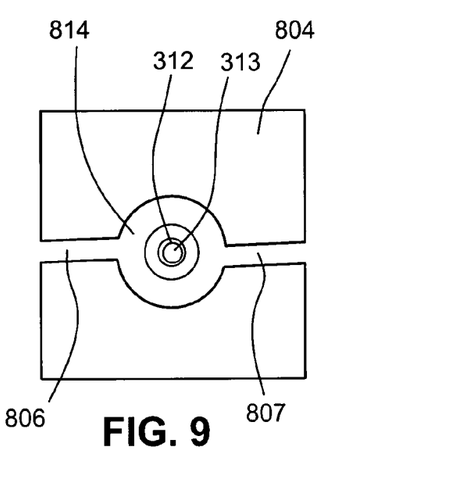
FIG. 9 is a cross-section view along the line C-C of FIG. 8.
Figure 10:
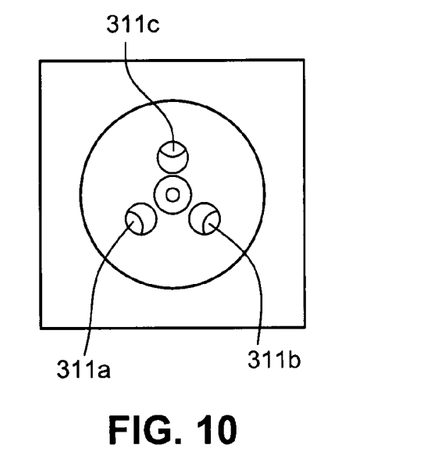
FIG. 10 is a cut-away view along the line D-D of FIG. 8

A third embodiment of the fibre coating unit 18 is shown in FIGS. 8-10, and comprises positive pressure chamber 301, coating chamber 802 and positive pressure chamber 303. The uncured resin coated fibre unit 12 passes through these in the direction indicated by arrow 300. An air and microsphere mixture within coating chamber 802 causes multiple microspheres to adhere to the uncured resin coating of the fibre unit, which is then cured downstream as discussed earlier.

Coating chamber 802 comprises two substantially solid blocks 804 and 305, separated by a cylindrical glass tube 191, which together define a passage through which the fibre unit 12 passes. A mixture of air and microspheres is admitted into the coating chamber 802 (in the directions indicated by arrows 398 and 309) via two inlet ducts 806 and 807 formed within upper block 804. The two ducts 806 and 807 open into an annular cavity 814 within block 804 formed concentrically around the passage through which the fibre unit will pass. The cavity 814 is shaped to have a frusto-conical outer wall and opens directly into the end of glass tube 191. A cross section view through coating chamber 802 along line C-C is shown in FIG. 9, illustrating inlet ducts 806 and 807 opening onto annular cavity 814. The air and microsphere mixture passes through this annular cavity and then into glass tube 191.

FIG. 9 shows that whilst inlet ducts 806 and 807 are directed generally radially inwards towards the passage through which the fibre unit will pass, they are in fact slightly offset from the radial position. This causes improved mixing of the air/microsphere mixture as it impinges at an angle on the inner wall of the cavity 814, and also improves the flow of the mixture through the chamber. This allows the system to be run at very high speeds, increasing the flow of air/microsphere mixture whilst still providing good coating of the uncured resin surface of the fibre with microspheres.

The air and microsphere mixture may be created either by fluidising the microspheres in a hopper (not shown) or a mechanical metering method. The microspheres are entrained with the flow of air through ducts 806 and 807, annular cavity 814, and through glass tube 191 where the coating of the fibre occurs. The air and microsphere mixture finally passes through a frusto-conical shaped cavity 310 within lower block 305 formed concentrically around the passage through which the fibre unit will pass. The unused air/microsphere mixture exits the coating chamber 802 via three outlets 311a, 311b and 311c, and can be recycled for later use by re-entry via inlet ducts 806 and 807 if desired. A cut-away view through block 305 along the line D-D is shown in FIG. 10.

The distribution of glass microspheres adhering to the fibre unit 12 can be readily and quickly adjusted by changing the feed rate of the air/microsphere mixture through inlet ducts 806 and 807. A down stream sensor (not shown) can detect the coating against the distribution of the microspheres on the fibre unit 12 after it has exited the fibre coating unit, and a control unit may be provided to vary the air/microsphere feed rate so as to vary the density or distribution accordingly.

Positive pressure chambers 301 and 303 are provided at either end of the coating chamber 802, so as to prevent leakage of the microspheres from the chamber, and to protect the system from blockage by microspheres where the fibre unit enters and leaves the chamber. Pressure chamber 301 comprises an elongate cylindrical channel 313 formed by tubing 312, through which the fibre unit 12 will pass. Part way along this channel is an inlet provided by tubing 214, via which pressurised gas is introduced into channel 313. Part of tubing 312 extends through block 804.

Channel 313 is designed to have differing minimum internal diameters either side of the inlet, with the portion of channel 313 on the side of the inlet furthest from the chamber having the smaller minimum internal radius, namely at location 313a. Pressurised gas entering the channel via inlet tubing 214 will thus flow preferentially in the direction towards the coating chamber 802.

Positive pressure chamber 301 is designed such that channel 313 terminates substantially concurrently with the end of annular cavity 814 through which the air/microsphere mixture flows, thus ensuring that the fibre unit is protected from the microspheres becoming too deeply embedded in the resin coating.

The design of positive pressure chamber 301, ducts 806 and 807 and cavity 814 together ensure that the flow of air through ducts 806 and 807 has ceased to be directed generally radially inwards (which could create too great a force of impinging microsphere particles on the fibre unit resulting in the microspheres becoming embedded too deeply and/or damaging the fibre unit) but has instead been redirected to flow generally longitudinally along the chamber 802, within tube 191. Thus, the flow of gas/microsphere mixture as it enters the tube 191 (i.e. the vector sum of the individual flow vectors of the molecules within the gas/microsphere mixture at that point) is directed generally parallel with respect to the longitudinal axis of the closest portion of fibre unit 12. There is of course a distribution of various speeds and directions of the molecules within the mixture which enables microspheres to impinge upon and adhere to the resin coating, but the fact that overall the flow is generally parallel to the fibre means that it prevents a significant number of the microspheres from impinging directly onto the fibre at too great a speed. This enables the system to be run at very high speeds, increasing the flow of air/microsphere mixture accordingly without damage to the fibre unit and/or poor coating quality, and achieving speeds typically between 300-500 m/min.

It is understood that corresponding positive pressure chamber 303 at the other end of the coating chamber 802 is similar in design and operation to chamber 301.

The design of the fibre coating unit of the third embodiment also facilitates, in operation, easy threading through of fibre unit 12. Threading is achieved by inserting a pole from each end through positive pressure chambers 301 and 303, the poles having mating connections which meet centrally within the glass tube 191. The transparent nature of the glass tube allows the user to easily view the mating connecting ends of the two poles, which once connected together can be pulled though until one of the poles (a tube through which the fibre may be threaded) extends throughout the chamber 802. The fibre unit may then be fed through the tube, which is then removed.

It will be appreciated that aspects of the various embodiments described above can be combined together where appropriate, and that the invention can be implemented using suitable materials and apparatus as will be apparent to the skilled person.

What is claimed is:

1. Apparatus for coating a fibre unit with particulate matter, the apparatus comprising:
    an enclosed elongated fibre unit passageway through which the fibre unit passes in use;
    a gas inlet for admitting flowing gas into the elongated passageway in a direction generally parallel with respect to a longitudinal axis of the fibre unit as it enters the passageway;
    an admission inlet for admitting a particulate matter and gas mixture into the elongated passageway at an angle with respect to the longitudinal axis of the fibre unit so as to become entrained in the flowing gas and provide a mixture flowing generally parallel to the longitudinal axis of the fibre unit for coating the fibre unit; and
    a particulate outlet configured to direct unused particulate matter from the elongated passageway in a direction substantially parallel to the longitudinal axis of the fibre unit.

2. Apparatus according to claim 1, wherein:
    the admission inlet, at the region in which the particulate and gas mixture enters the passageway, has the form of plural inlets into a cavity surrounding the entire passageway and being open to the entire passageway all the way round so as to admit said flow of particulate and gas mixture circumferentially into said passageway in a substantially uniform manner.

3. Apparatus for coating a fibre unit with particulate matter, the apparatus comprising:
    an enclosed elongated passage through which the fibre unit passes in use;
    an admission inlet configured and disposed to admit a particulate and gas mixture into the passage;
    wherein the admission inlet, in the region at which the mixture enters the passage, is configured as plural inlets feeding a cavity surrounding the passage and being open to the passage all the way round so as to admit particulate and gas mixture thereinto in a circumferential substantially uniform manner while also flowing generally parallel to a longitudinal axis of the elongated passage for coating the fibre unit; and
    a particulate outlet configured to direct unused particulate matter from the elongated passageway in a direction substantially parallel to the longitudinal axis of the fibre unit.

4. Apparatus according to claim 2, wherein the cavity is cylindrically symmetric.

5. Apparatus according to claim 2, wherein an outer wall of the cavity is frusto-conical.

6. Apparatus according to claim 2, wherein the admission inlet further comprises two inlet ducts opening generally radially onto the cavity.

7. Apparatus according to claim 6, wherein the inlet ducts are offset from a true radial position.

8. Apparatus according to claim 1, wherein the apparatus is configured to make the feed rate of the particulate matter and gas mixture through the admission inlet controllable.

9. A method of coating a fibre unit with particulate matter, said method comprising:
    feeding a fibre unit through an enclosed elongated passage defined in a coating chamber;
    directing flowing gas into the passage generally parallel to a longitudinal axis of the fibre unit as it enters the passageway;
    feeding a mixture of particulate matter and gas into the flowing gas through plural admission inlets;
    directing a mixture of the flowing gas and the particulate matter and gas to flow generally parallel through the elongated passage with respect to a longitudinal axis of the fibre unit for coating the fibre unit; and
    directing unused particulate matter from the elongated passage via a particulate outlet in a direction substantially parallel to the longitudinal axis of the fibre unit.

10. A method according to claim 9 wherein, in the region in which the particulate matter and gas mixture enters the passage, the admission inlets feed into a cavity circumferentially encircling the elongated passage.

11. A method of coating a fibre unit with particulate matter, said method comprising:
    feeding a fibre unit through an elongated passage defined in a coating chamber;
    feeding a mixture of particulate matter and gas through an admission inlet into the passage to flow generally parallel to a longitudinal axis of the passage while also being substantially uniformly distributed around the fibre unit for coating the fibre unit;
    wherein, in the region in which the mixture first enters the passage, the admission inlet is shaped in the form of a cavity encircling the elongated passage circumferentially; and directing unused particulate matter from the elongated passage via a particulate outlet in a direction substantially parallel to the longitudinal axis of the fibre unit.

12. A method according to claim 10, wherein the cavity is cylindrically symmetric.

13. A method according to claim 10, wherein the outer wall of the cavity is frusto-conical.

14. A method according to claim 10, further comprising:
feeding the particulate matter and gas mixture via two inlet ducts generally radially onto the cavity.

15. A method according to claim 14, wherein the inlet ducts are offset from a true radial position.

16. A method according to claim 11, further comprising:
controlling the feed rate of the particulate matter and gas mixture through the admission inlet.

17. Apparatus for uniformly coating a moving resin-covered elongated fibre unit with particulate matter, said apparatus comprising:
an enclosed elongated passage through which a resin-covered fibre unit passes during use; and
a gas/particulate mixture inlet distributed circumferentially from plural discrete feed points about said elongated passage and configured to introduce a substantially uniform circumferential flow of gas/particulate mixture into said passage so as to flow generally parallel to a longitudinal axis of said resin-covered fibre unit as it first passes through said elongated passage.

18. Apparatus as in claim 17 wherein said elongated passage comprises an elongated substantially uniform circular cross section.

19. Apparatus as in claim 17 wherein said inlet comprises at least two inlet ports disposed uniformly around a circumference of the elongated passage.

20. Apparatus as in claim 17 further comprising means for moving said fibre unit in the same direction as said flow of gas/particulate mixture while passing through said passage.

21. Apparatus as in claim 17 wherein:
said elongated passage begins downstream of said inlet; and
said inlet includes a protective passage therethrough in which the fibre unit passes on its way to the elongated passage, said protective passage shielding the fibre unit from contact with gas/particulate mixture until it enters the elongated passage.

22. A method for uniformly coating a moving resin-covered elongated fibre unit with particulate matter, said method comprising:
passing a resin-covered fibre unit through an enclosed elongated passage; and
circumferentially distributing a gas/particulate mixture into said elongated passage from plural discrete feed points so as to generate a substantially uniform circumferential flow of gas/particulate mixture into and generally parallel to a longitudinal axis of said resin-covered fibre unit as it passes through said elongated passage.

23. A method as in claim 22 wherein said elongated passage comprises an elongated substantially uniform circular cross section.

24. A method as in claim 22 wherein said distributing steps comprises introducing said gas/particulate mixture through at least two inlet ports disposed uniformly around a circumference of the elongated passage.

25. A method as in claim 22 further comprising moving said fibre unit in the same direction as said flow of gas/particulate mixture while passing through said passage.

26. A method as in claim 22 wherein:
said elongated passage begins downstream of said inlet; and
said fibre unit passes through a protective passage on its way to the elongated passage, said protective passage shielding the fibre unit from contact with gas/particulate mixture until it enters the elongated passage.

* * * * *